(12) United States Patent
Kim et al.

(10) Patent No.: US 7,466,493 B2
(45) Date of Patent: Dec. 16, 2008

(54) LIQUID LENS

(75) Inventors: Sung Chan Kim, Seoul (KR); Ha Yong Jung, Gyeonggi-do (KR); Jin Hyuck Yang, Gyeonggi-do (KR); Young Ho Lee, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 95 days.

(21) Appl. No.: 11/715,371

(22) Filed: Mar. 8, 2007

(65) Prior Publication Data

US 2007/0217023 A1 Sep. 20, 2007

(30) Foreign Application Priority Data

Mar. 8, 2006 (KR) .................. 10-2006-0021646

(51) Int. Cl.
*G02B 1/06* (2006.01)
(52) U.S. Cl. ...................... 359/666; 359/665
(58) Field of Classification Search .......... 359/665–667
See application file for complete search history.

(56) References Cited

FOREIGN PATENT DOCUMENTS

| | | |
|---|---|---|
| JP | 1996-258624 | 10/1996 |
| JP | 2002-341311 | 11/2002 |
| JP | 2006-48818 | 2/2006 |
| KR | 10-2005-0033308 | 4/2005 |

*Primary Examiner*—Darryl J Collins

(57) ABSTRACT

A liquid lens comprises a cylindrical body having a pair of glass lenses which are coupled to upper and lower openings of the body, respectively; an aspheric transmitting partition lens inserted and fixed in the central portion of the body; an auto-focus lens section composed of a first insulating liquid layer and a first electrolyte layer which are filled under the transmitting partition lens so as to form an interface therebetween; an optical zoom lens section composed of a second insulating liquid layer and a second electrolyte layer which are filled above the transmitting partition lens so as to form an interface therebetween; and a minute auto-focus lens section composed of a third insulating liquid layer of which the upper surface comes in contact with the lower surface of the transmitting partition lens and of which the lower surface forms an interface with the first electrolyte layer such that the third insulating liquid layer is not mixed with the first electrolyte layer.

8 Claims, 4 Drawing Sheets

[FIG. 1]
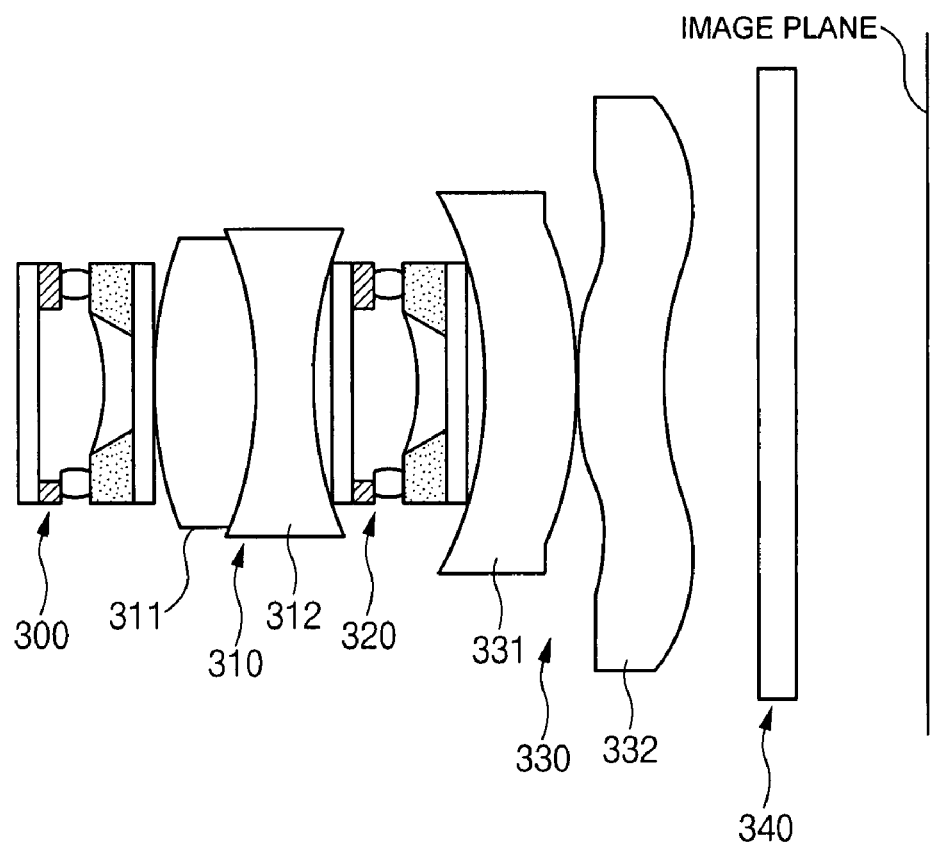
[FIG. 2]
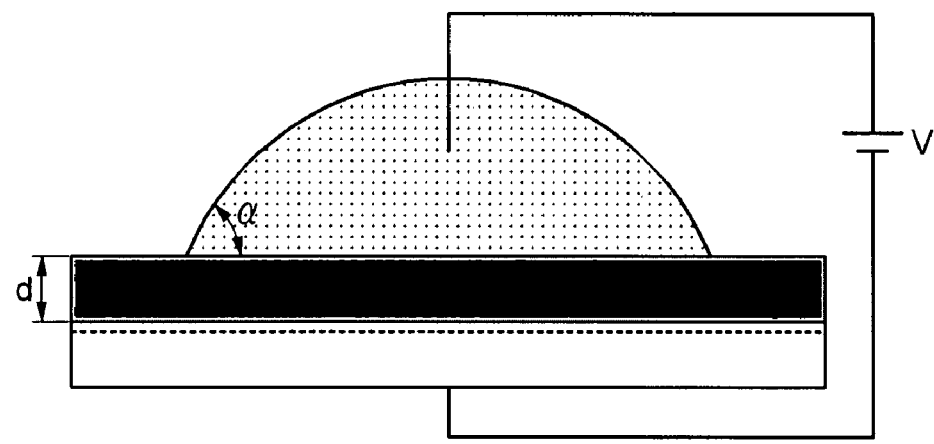

[FIG. 3]
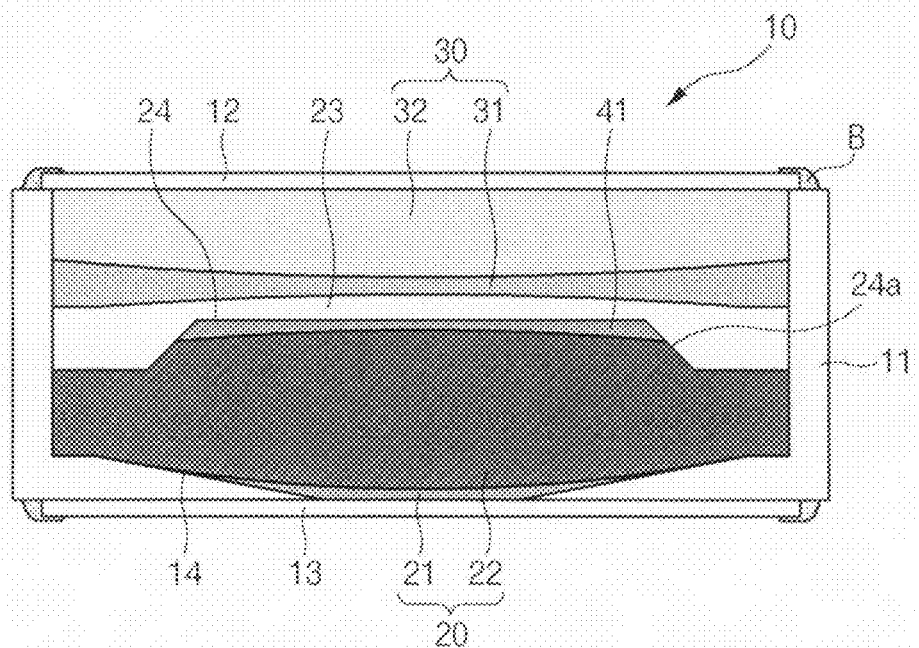
[FIG. 4]
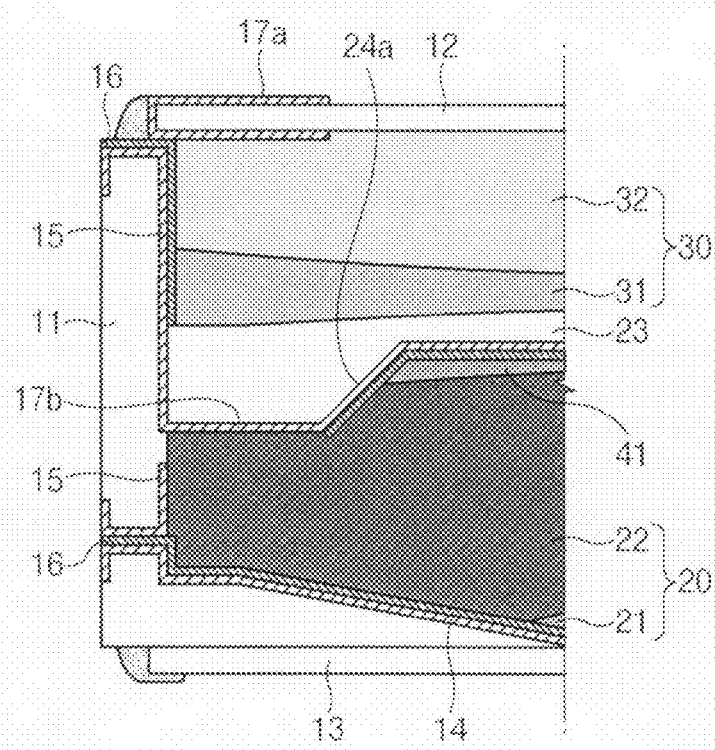

[FIG. 5]
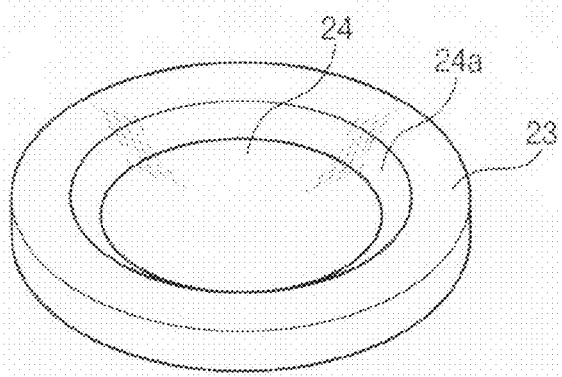
[FIG. 6A]
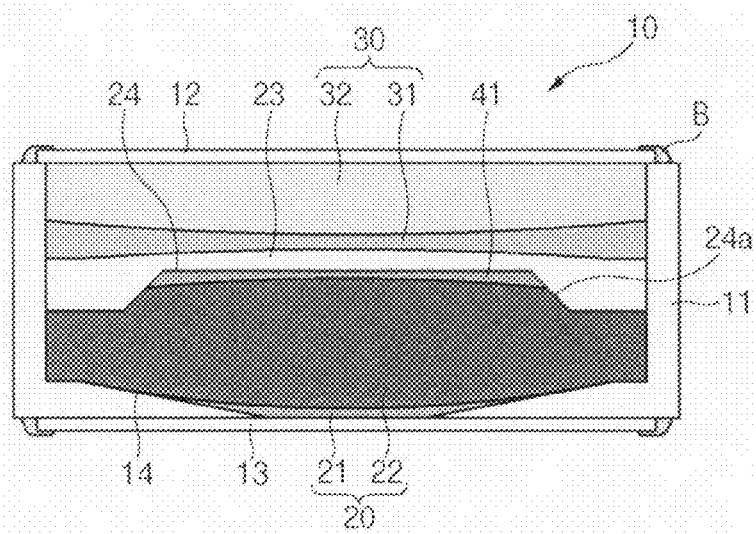
[FIG. 6B]
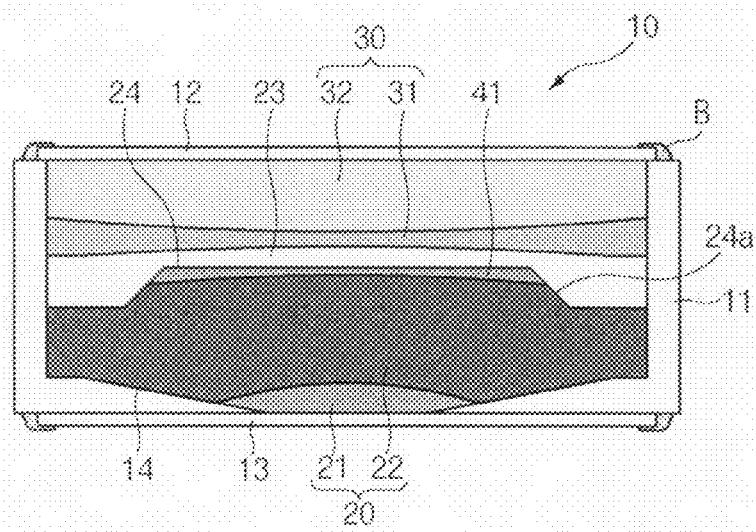

[FIG. 6C]
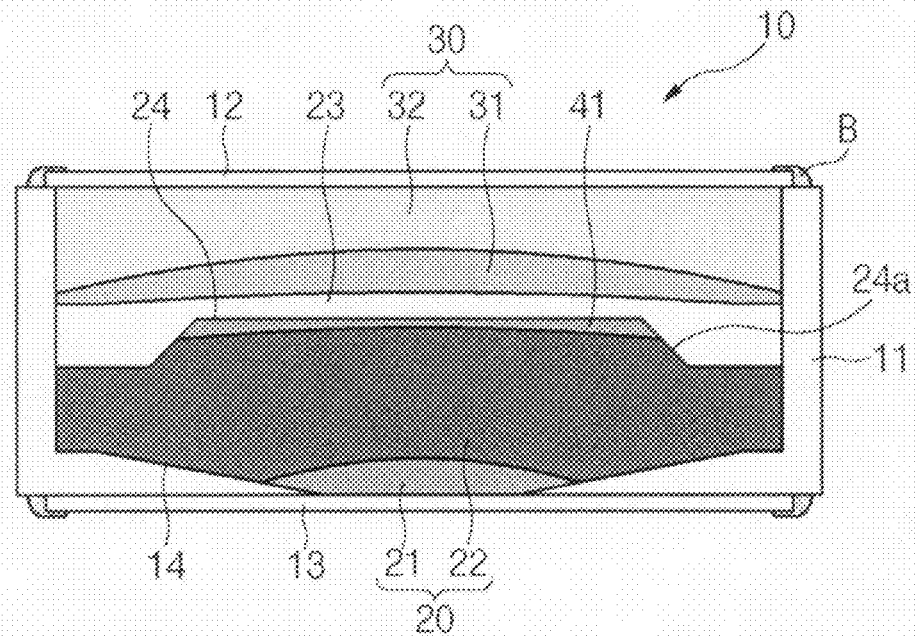
[FIG. 6D]
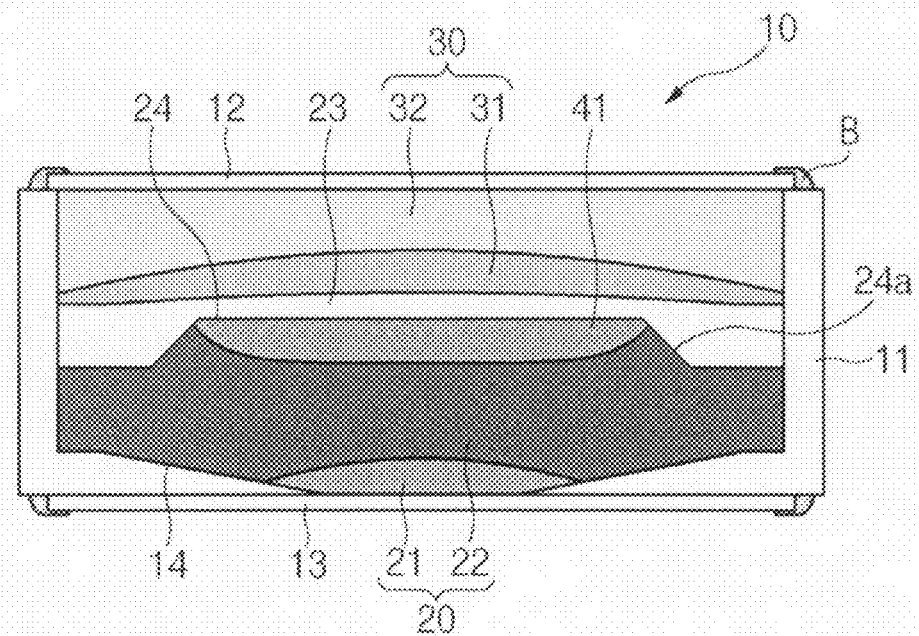

LIQUID LENS

CROSS-REFERENCE TO RELATED APPLICATIONS

This application claims the benefit of Korean Patent Application No. 10-2006-0021646 filed with the Korea Intellectual Property Office on Mar. 8, 2006, the disclosure of which is incorporated herein by reference.

BACKGROUND OF THE INVENTION

1. Field of the Invention

The present invention relates to a liquid lens to be mounted on mobile phones. In the liquid lens, electrolytes and insulating liquids, of which the curvatures are varied by the application of voltage, are filled in a cylindrical body so as to form a plurality of interfaces in the upper and lower portions thereof by reference to a transmitting partition lens. In this state, as a quantity of electric charge is adjusted through electrodes connected to the electrolytes, an optical zoom function, an auto-focus function, and a minute auto-focus function can be implemented at the same time.

2. Description of the Related Art

In recent years, as new types of mobile terminal, such as mobile phones or personal digital assistances (PDA), integrating a camera have been increasingly released in the market, a demand for a mobile terminal integrating a camera of a high pixel and various functions has been also growing. Such a mobile terminal camera comprises a lens affixed to an image pickup device such as charge coupled device (CCD), complementary metal oxide semiconductor (CMOS), and the like, and is configured to pick up an image of a subject through the lens and to allow data of a picked-up image to be recorded by means of a predetermined recording medium.

In order to provide capability of a mega-pixel level to the camera according to a recent trend, the lens must be designed not only to have sufficient resolving power, but also to have a greater size than those of sensors in consideration of assembly tolerance.

For a lens system mounted to the mobile terminal and used to pick up the image of the subject, it generally suffers from various kinds of aberration, such as spherical aberration, astigmatism, distortion aberration, etc. causing deformation of the shape or the morphology of the image of the subject due to influence of incident light having various wavelengths, which is incident on the lens upon image pickup of the subject. Thus, it is necessary to have implementation which can suppress occurrence of the aberration as much as possible.

Such a lens system can realize zoom in order to have a variable focal length. A zoom function of the lens system can be generally achieved by adjusting a separation between lenses via a relative movement between a front lens having a positive refractive index and a rear lens having a negative refractive index. For a general camera, a wide angle lens or a telephoto lens capable of changing a focal distance between an existing lens and an added lens is additionally affixed to the camera to maximize the zoom function, thereby allowing a user to take a picture at various viewing angles at one place without moving.

The zoom is generally divided into an optical zoom and a digital zoom. The optical zoom refers to a state where the image of the subject is magnified by a variable focal distance by relatively moving an optical lens affixed to the camera. The digital zoom refers to a state where the image of the subject is magnified in the CCD and displayed thereon, as magnifying an image in a graphic program such as Photo-Shop and the like.

For the digital zoom, the image of the subject is magnified in the CCD, thereby allowing elimination of a space for movement of the lenses according to variation in focal distance. As such, the digital zoom is advantageous in terms of miniaturization and compactness, but has a problem in that clear resolution cannot be achieved upon image pickup by the zoom operation.

On the contrary, for the optical zoom, the zoom operation is realized by virtue of the variation in focal distance between the lenses, thereby requiring the space for movement of the lenses according to the variation in focal distance. Hence, the optical zoom is disadvantageous in that it requires a large space for a lens part and a lens barrel surrounding the lens part. However, it can be preferred to the digital zoom by consumers due to its merits in clear resolution upon the zoom operation, irrespective of its disadvantage of increasing the volume of the mobile terminal.

Nevertheless, a recent tendency of miniaturization and compactness in the market requires a decrease in space for changing the focal distance, and thus, manufacturers have mainly released mobile terminals which incorporate the digital zoom function therein rather than the optical zoom function. In recent years, the optical zoom type mobile terminals have also been released, which can embody the optical zoom function through a rear side of the mobile terminal.

Korean Patent Application No. 2003-0003984 discloses one of conventional mobile terminals which can embody the optical zoom function. The mobile terminal of the disclosure has an improved lens barrel structure for an optical zoom applicable to the digital camera and the like. In other words, there are disclosed a lens barrel structure of a zoom camera, which has a small size and high resolution and can be easily manufactured, and a zoom lens assembly with the lens barrel structure.

The zoom lens assembly comprises a front lens, a rear lens having a negative refractive index, an inner barrel which has a helicoid groove formed along a surface of the inner barrel to guide a helical movement of the front and rear lenses, and an outer barrel capable of being inserted along the surface of the inner barrel and having an escaping groove formed on an inner surface of the outer barrel to guide a vertical movement of the front and the rear lenses.

With the zoom camera constructed as above, the inner and outer barrels are positioned at one side of the mobile terminal in a telescopic manner such that a focal distance of the zoom camera can vary in relation to the movement between the lenses as the inner and outer barrels are sequentially spread out by driving of a motor inside the terminal, thereby realizing the optical zoom function. Consequently, the zoom camera of the disclosure has a disadvantage in that it requires a large space for the zoom operation within the camera.

In addition, since the motor of the camera is inevitably operated in such a way so as to push the inner and outer barrels having the plural lenses received therein to an outside of the zoom camera, loss of power during driving of the motor causes an increase in power consumption of a battery.

In order to solve the problems as mentioned above, a liquid lens has been developed, which occupies a small space within the mobile terminal and does not suffer from power consumption. The liquid lens comprises a electrolyte and an insulating liquid in a single lens barrel to form an interface therebetween, of which curvature is changed by application of voltage to the electrolyte through the lens barrel, in order to embody the zoom function.

One of the liquid lenses capable of embodying the zoom function is disclosed in Korean Patent Laid-open Publication No. 2005-0033308, entitled "Zoom camera using the liquid lens for mobile phone, control system and method thereof," which will be described hereinafter with reference to FIG. 1.

FIG. 1 is a sectional view of a conventional liquid lens. Referring to FIG. 1, the conventional liquid lens includes a first group of lenses 310 comprising a first lens 311 with a positive refractive index and a second lens 312 with a negative refractive index, a first liquid lens 300 comprising an interface formed between a conductive liquid and an insulating liquid, the interface being varied in curvature in response to a control signal for a zoom function, a second group of lenses 330 comprising a third lens 331 having both aspheric surfaces with a positive refractive index and a fourth lens 332 having both aspheric surfaces with a negative refractive index, and an infrared filter 340 spaced at a predetermined distance from the second group of lenses 330.

The conventional liquid lens of the disclosure is operated on the basis of an electrowetting phenomenon, as shown in FIG. 2, wherein the electrowetting phenomenon is caused by variation of the contact angle α resulting from change in surface tension of an interface by movement of charges residing on the interface. In particular, a thin dielectric member is positioned on the interface to allow the interface to have a high potential difference, and the charges in the electrolyte have characteristics of moving towards an upper surface of the interface due to chemical properties.

At this point, when an electric field is applied to the interface from the outside, the characteristics of the charges are further intensified, and the concentration of the charges is significantly increased at a triple contact line where the interfaces overlap each other, thereby increasing repulsive force between the charges. Then, the surface tension is lowered at a corner of a liquid droplet.

Since the electrowetting phenomenon can be used for easy controlling of a minute amount of liquid and fine particles in the liquid, various investigations have been undertaken in recent years for application of the electrowetting phenomenon to a variety of products, for example, liquid lenses, micro pumps, display devices, optical devices, micro electro mechanical systems (MEMS), etc.

In particular, a liquid lens for auto-focus can have improved characteristics in view of small size, low power consumption and rapid response rate, compared with a conventional mechanical driving type lens.

The liquid lens constructed as above can embody the zoom function by virtue of the variation in curvature of the interface between the conductive liquid and the insulating liquid of the individual liquid lens within the single lens barrel in which the plural groups of lenses and the liquid lens are received, thereby solving the problem of spatial restriction by the conventional optical zoom lens which employs the telescopic lens barrel. However, irrespective of these merits, the conventional liquid lens has a problem in that the single liquid lens only permits the zoom function by the variation in curvature between the liquids contained in the barrel.

Further, the conventional liquid lens has a problem of making the structure of the camera complicated. In particular, in order to allow the camera using the liquid lens to embody other functions, for example, an auto-focus (A/F) adjustment function, as well as the zoom function, an additional liquid lens to act as a front lens must be affixed to the camera, making the structure of the camera more complicated.

Furthermore, the insulating liquids and the electrolytes forming a plurality of interfaces are inevitably sensitive to an external impact and swaying, because of a characteristic of the liquid lens. Therefore, although the optical zoom function and the auto-focus function can be embodied with a complicated structure, the auto-focus function for adjusting a focus on an object is not performed in a desired way.

SUMMARY OF THE INVENTION

An advantage of the present invention is that it provides a liquid lens. In the liquid lens, electrolytes and insulating liquids, of which the curvatures are varied by the application of voltage, are filled in a cylindrical body so as to form a plurality of interfaces in the upper and lower portions thereof by reference to a transmitting partition lens. In this state, as the curvatures of the electrolytes and the insulating liquids are sequentially varied by an applied voltage, a quantity of electric charge is adjusted. Then, an optical zoom function, an auto-focus function, and a minute auto-focus function can be implemented at the same time.

Additional aspect and advantages of the present general inventive concept will be set forth in part in the description which follows and, in part, will be obvious from the description, or may be learned by practice of the general inventive concept.

According to an aspect of the invention, a liquid lens comprises a cylindrical body having a pair of glass lenses which are coupled to upper and lower openings of the body, respectively; an aspheric transmitting partition lens inserted and fixed in the central portion of the body; an auto-focus lens section composed of a first insulating liquid layer and a first electrolyte layer which are filled under the transmitting partition lens so as to form an interface therebetween; an optical zoom lens section composed of a second insulating liquid layer and a second electrolyte layer which are filled above the transmitting partition lens so as to form an interface therebetween; and a minute auto-focus lens section composed of a third insulating liquid layer of which the upper surface comes in contact with the lower surface of the transmitting partition lens and of which the lower surface forms an interface with the first electrolyte layer such that the third insulating liquid layer is not mixed with the first electrolyte layer.

According to another aspect of the invention, the body has an inner circumferential surface formed of metal coated surface using gold (Au).

According to a further aspect of the invention, the aspheric partition lens has a bottom surface of which the peripheral portion is formed with an inclined surface which is inclined at an obtuse angle of more than 90 degrees.

According to a still further aspect of the invention, the partition lens is formed of a transmitting material.

According to a still further aspect of the invention, the partition lens has a hydrophobic coating film or an insulation coating film formed thereon.

According to a still further aspect of the invention, by reference to the partition lens, the liquids of the first insulating liquid layer, the first electrolyte layer, and the third insulating liquid layer, which are laminated under the partition lens, have the same characteristic, and the liquids of the second insulating liquid layer and the second electrolyte layer, which are laminated above the partition lens, have the same characteristic.

According to a still further aspect of the invention, the liquids above and under the partition lens have different characteristics and properties from each other.

According to a still further aspect of the invention, the third insulating liquid layer is driven by a variation in curvature of the upper interface of the first electrolyte layer to which a voltage is applied through a coating film extending from the metal coated surface formed on the inner circumferential surface of the body.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a sectional view of a conventional liquid lens;

FIG. 2 is a schematic view showing a typical electrowetting effect which is applied to a liquid lens;

FIG. 3 is a sectional view of a liquid lens according to the present invention;

FIG. 4 is an enlarged sectional view illustrating one side portion of the liquid lens according to the invention;

FIG. 5 is a perspective view illustrating the rear surface of an aspheric transmitting partition lens mounted on the liquid lens according to the invention; and FIG. 6A to 6D are sectional views illustrating an operation of the liquid lens according to the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a liquid lens according to an embodiment of the present invention will be described in detail with reference to the accompanying drawings.

Structure of Liquid Lens

FIG. 3 is a sectional view of a liquid lens according to the invention. FIG. 4 is an enlarged sectional view illustrating one side portion of the liquid lens according to the invention. FIG. 5 is a perspective view illustrating the rear surface of an aspheric transmitting partition lens mounted on the liquid lens according to the invention.

As shown in the drawings, the liquid lens 10 includes a cylindrical body 11, a pair of glass lenses 12 and 13, an auto-focus lens section 20, an optical zoom lens section 30, and a minute auto-focus lens section 41. The respective glass lenses 12 and 13 are attached and fixed to the upper and lower openings of the cylindrical body 11. Inside the body 11, a plurality of electrolyte layers 22 and 32 and a plurality of liquid insulating layers 21, 31, and 41 are laminated so as to form multiple interfaces, the electrolyte layers 22 and 32 and the liquid insulating layers 21, 31, and 41 having different properties from each other. The liquid lens 10 is divided into upper and lower portions by a transmitting partition lens 23.

The body 11 is formed of metal or ceramic material. The bottom surface of the body 11 is formed with an inclined surface 14 which is inclined downward toward the central portion thereof. The pair of glass lenses 12 and 13 are attached and fixed to the upper and lower end surfaces of the body 11 by an adhesive B such that the upper and lower openings of the body 11 are closed.

The inclined surface 14 of the body 11 serves to fix a first insulating liquid layer 21 to the central portion of the body 11, the first insulating liquid layer 21 being positioned at the lowermost portion. The inclined surface 14 is formed so as to reduce the overall size of the auto-focus lens section 20, when the interface therebewteen is refracted in accordance with the application of a voltage.

In the lower portion of the body 11, the first insulating liquid layer 21 and a first electrolyte layer 22 are laminated to form an interface therebetween, the first insulating liquid layer 21 and the first electrolyte layer 22 having a different property and being formed of transmitting liquids which have the same density but are not mixed with each other. On the first electrolyte layer 22, a third insulating liquid layer 41 is sequentially laminated to form another interface.

On the third insulating liquid layer 41, the transmitting partition lens 23 formed with an aspheric surface is received so that the upper surfaces of the first electrolyte layer 22 and the third insulating liquid layer 41 simultaneously come in contact with the transmitting partition lens 23. Under the partition lens 23, the auto-focus lens section 20 is formed, including the third insulating liquid layer 41 serving as the minute auto-focus lens section.

In the auto-focus lens section 20, when a voltage is applied to the first electrolyte layer 22 having an interface with the first insulating layer 21, the curvature of the first electrolyte layer 22 composed of conductive liquid is varied. Then, the first insulating liquid layer 21 becomes convex upward so that an auto-focus (A/F) function is carried out.

As a quantity of electric charge is increased or decreased by adjusting a voltage to be applied to the first electrolyte layer 22, the curvature of the upper portion of the first electrolyte layer 22 is varied. Then, simultaneously with or sequentially after the first insulating liquid layer 21, the third electrolyte layer 41 becomes convex downward so that a minute auto-focus (A/F) function is carried out.

Functional differences between the auto-focus function and the minute auto-focus function and the operations thereof will be described with reference to the operational structure of the liquid lens.

The partition lens 23 received on the auto-focus lens section 20 and the third insulating liquid layer 41 is formed with an aspheric surface of which the upper surface is convex and the lower surface is concave. The partition lens 23 is formed of a transmitting lens such as a plastic lens or glass lens having transmittance. The circumferential surface of the partition lens 23 is closely attached to the central portion of the inner circumferential surface of the body 11. Further, the partition lens 23 serves to divide the liquid lens 10 into the auto-focus lens section 20, including the third electrolyte layer 41, the first electrolyte layer 22, and the first insulating liquid layer 21, and the optical zoom lens 30 including the second electrolyte 32 and the second insulating liquid layer 31.

The aspheric transmitting partition lens 23 has a groove 24 formed at a predetermined depth in the center portion of the lower surface. In the peripheral portion of the groove 24, an inclined surface 24a having an obtuse angle of more than 90 degrees is provided. In such a structure having the inclined surface 24a, the third electrolyte layer 41 injected into the groove 24 is formed to have a smaller size than the liquid insulating layer above the partition lens 23. By the inclined surface 24a, the third electrolyte layer 41 is concentrated in the central portion.

On the surface of the partition lens 23, a hydrophobic coating film is formed so that the upper and lower insulating liquids are absorbed into the surface of the partition lens 23. Then, the respective insulating liquids are fixed at the central portion of the partition lens 23 such that a stable operation is performed.

In addition, the partition lens 23 may have an insulation coating film formed thereon, the insulation coating film being composed of the same material as that of the inner circumferential surface of the body 11 in some cases.

In the optical zoom lens section 30 laminated on the auto-focus lens section 20, a second insulating liquid layer 31 and a second electrolyte layer 32 are laminated so as to form an interface therebetween, the second insulating liquid layer 31 and the second electrolyte layer 32 being formed of liquids having the same property. As a voltage is applied to the second electrolyte layer 32, the interface between the second insulating liquid layer 31 and the second electrolyte layer 32 is refracted. Then, the second electrolyte layer 31 becomes convex upward so that an optical zoom function is carried out.

The respective insulating liquids and the respective electrolyte liquids, which are laminated so as to form the plurality of interfaces in the auto-focus lens section 20 and the optical zoom section 30, have different characteristics from each other. The electrolyte liquids mainly consist of water ($H_2O$), into which inorganic salts and polar solvent are added. The insulating liquids mainly consist of silicon oil, into which non-polar solvent is added. When the electrolyte liquid and the insulating liquid come in contact with each other, they are not mixed with each other, but form an interface having a predetermined curvature.

The liquids forming the first and second electrolyte layers 22 and 31 include the same constituent, but have a different composition such that their properties are different from each other. Similarly, the insulating liquid of the first insulating liquid layer 21 includes the same constituent as the second insulating liquid layer 31, but has a different property from that of the second insulating liquid layer 31.

By reference to the partition lens 23, the liquids of the first insulating liquid layer 21, the first electrolyte layer 22, and the third electrolyte layer 41, which are laminated under the partition lens 23, have the same characteristic, and the liquids of the second insulating liquid layer 31 and the second electrolyte layer 32, which are laminated above the partition lens 23, have the same characteristic. Alternately, the liquids above and under the partition lens 23 are insulating liquid and electrolyte having a different characteristic from each other.

As shown in FIG. 4, the body 11 composing the liquid lens 10 has the inner circumferential surface formed with a metal coated surface 15 which can serve as an electrode. The coated surface 15 is formed by a surface coating method using gold (Au). Gold hardly reacts when coming in contact with various liquids.

On the metal coated surface 15, an insulation coating film 16 is formed so as to serve as an insulating film such that insulating surfaces coming in contact with the plurality of liquids are formed. On the interfaces of the peripheral portions of the respective electrolyte layers 22 and 32, extended coating films 17a and 17b are formed so as to apply a voltage to the electrolyte layers 22 and 32, respectively. An electrical signal applied to the body 11 is applied to the electrolytes through the coating films 17a and 17b connected to the electrolyte layers 22 and 33, respectively.

Operation of Liquid Lens

FIG. 6A to 6D are sectional views illustrating an operation of the liquid lens according to the invention. FIG. 6A shows an initial state before a voltage is applied. FIG. 6B shows a state where a voltage is applied to the auto-focus lens section. FIG. 6C shows a state where a voltage is simultaneously applied to the optical zoom lens section and the auto-focus lens section. FIG. 6D shows a state where a voltage is simultaneously applied to the auto-focus lens section, the optical zoom lens section, and the minute auto-focus lens section.

In the initial state where a voltage is not applied as shown in FIG. 6A, the first insulating liquid layer 21 and the third insulating liquid layer 41 of the auto-focus lens section 20 and the second electrolyte layer 31 of the optical zoom lens section 30 respectively have the smallest thickness. At this time, the first electrolyte layer 22 forms interfaces with the insulating liquid layers 21 and 41, respectively, so as to have a predetermined curvature. Further, the second electrolyte layer 32 forms an interface with the insulating liquid layer 31 so as to have a predetermined curvature.

When a voltage is applied to the auto-focus lens section 20 of the body 11 in order to perform auto-focus driving, the voltage is applied to the peripheral portion of the first electrolyte layer 21 through the metal coated surface 15 of the inner circumferential surface of the body 11. Therefore, as shown in FIG. 6B, the first electrolyte layer 22 is driven so that the curvature of the interface therebetween is varied. Further, the first insulating liquid layer 21 is convexly refracted upward as much as the displacement of the varied curvature of the first electrolyte layer 22. Then, the auto-focus lens section 20 is driven.

FIG. 6C is a sectional view when the optical zoom section 30 of the liquid lens is driven. When a voltage is applied to the body 11, the voltage is applied through the metal coated surface 15 of the body 11 to the upper coating film 17a at the peripheral portion of the second electrolyte layer 32 such that the optical zoom lens section 30 is driven. Then, the second electrolyte layer 32 laminated on the transmitting partition lens 23 is driven so that the curvature of the interface with the second insulating liquid layer 31 is varied. The upper portion of the second insulating liquid layer 31 is convexly refracted in accordance with the displacement of the interface. Then, the optical zoom lens section 30 is driven.

The curvature displacement of the second electrolyte layer 32 is adjusted by a change in quantity of charge applied to the second electrolyte layer 32. Accordingly, an optical zoom magnification is determined in accordance with the thickness of the second insulating liquid layer 31 which is varied correspondingly.

FIG. 6D shows a state where the auto-focus lens section 20 and the optical zoom lens section 30 of the body 11 are simultaneously driven. In this state, the curvature of the third electrolyte layer 41 laminated on the first electrolyte layer 22 is varied in accordance with a change in amount of charge applied to the first electrolyte layer 22 such that a minute auto-focus function is implemented. When a voltage is simultaneously applied to the upper and lower coating films 17a and 17b through the metal coated surface 15 of the inner circumferential surface of the body 11, the first and second electrolyte layers 22 and 32 are simultaneously driven. Then, while the curvatures of the insulating liquid layers 21 and 31 forming interfaces with the respective electrolyte layers 22 and 32 are varied, the optical zoom function and the auto-focus function are performed at the same time.

At this time, when the body sways due to an external impact in the state of FIG. 6C where the optical zoom is performed or in the state of FIG. 6B where the optical zoom is not performed, when an object minutely moves in a state where the auto-focus function is performed so that the focus is fixed, or when minute focus adjustment through a macro lens (close up lens) is needed, a voltage is applied to the coating film 17b extending to the upper interface of the first electrolyte layer 22 such that the curvature of the upper interface of the first electrolyte layer 22 is varied. Then, as the third insulating liquid layer 41 on the first electrolyte layer 22 becomes convex downward, minute auto-focus adjustment is performed.

The application of voltage for the minute auto-focus adjustment can be automatically performed after the first insulating liquid layer 21 for performing the auto-focus function is driven. In some cases, the application can be performed only by a manual operation through the coating film 17b.

As described above, the liquid lens of the invention having such a structure is composed of the auto-focus lens section 20 and the optical zoom lens section 30. Further, the liquid lens has the aspheric transmitting partition lens 23 mounted so as to divide the liquid lens into the auto-focus lens section 20 and the optical zoom lens 30. The electrolyte layers 22 and 32 and the insulating liquid layers 21 and 31 are refracted at a predetermined curvature radius by voltages applied to the respective lens sections 20 and 30. Further, the third insulating liquid layer 41 under the partition lens 23 is simultaneously or sequentially driven by a change in quantity of electric charge. Then, the auto-focus function including a minute auto-focus function and the optical zoom function are implemented at the same time by the respective lens sections 20 and 30 in the single liquid lens.

According to the liquid lens of the present invention, when the magnitude of the voltage applied to the first electrolyte layer is adjusted or a separate voltage is applied to the metal coated film, the third electrolyte layer is driven so that the auto-focus function is performed. At this time, the minute auto-focus function is simultaneously or sequentially performed. Therefore, precise focus adjustment can be performed with respect to an object. Further, as instant auto-focus reaction is performed on the movement of an object or the swaying of the lens, it is possible to obtain a clear image at all times.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A liquid lens comprising:
   a cylindrical body having a pair of glass lenses which are coupled to upper and lower openings of the body, respectively;
   an aspheric transmitting partition lens inserted and fixed in the central portion of the body;
   an auto-focus lens section composed of a first insulating liquid layer and a first electrolyte layer which are filled under the transmitting partition lens so as to form an interface therebetween;
   an optical zoom lens section composed of a second insulating liquid layer and a second electrolyte layer which are filled above the transmitting partition lens so as to form an interface therebetween; and
   a minute auto-focus lens section composed of a third insulating liquid layer of which the upper surface comes in contact with the lower surface of the transmitting partition lens and of which the lower surface forms an interface with the first electrolyte layer such that the third insulating liquid layer is not mixed with the first electrolyte layer.

2. The liquid lens according to claim 1,
   wherein the body has an inner circumferential surface formed of metal coated surface using gold (Au).

3. The liquid lens according to claim 1,
   wherein the aspheric partition lens has a bottom surface of which the peripheral portion is formed with an inclined surface which is inclined at an obtuse angle of more than 90 degrees.

4. The liquid lens according to claim 1,
   wherein the partition lens is formed of a transmitting material.

5. The liquid lens according to claim 1,
   wherein the partition lens has a hydrophobic coating film or an insulation coating film formed thereon.

6. The liquid lens according to claim 1,
   wherein, by reference to the partition lens, the liquids of the first insulating liquid layer, the first electrolyte layer, and the third insulating liquid layer, which are laminated under the partition lens, have the same characteristic, and the liquids of the second insulating liquid layer and the second electrolyte layer, which are laminated above the partition lens, have the same characteristic.

7. The liquid lens according to claim 1,
   wherein the liquids above and under the partition lens have different characteristics and properties from each other.

8. The liquid lens according to claim 1,
   wherein the third insulating liquid layer is driven by a variation in curvature of the upper interface of the first electrolyte layer to which a voltage is applied through a coating film extending from the metal coated surface formed on the inner circumferential surface of the body.

* * * * *